United States Patent
Ikehashi

(10) Patent No.: US 8,174,306 B2
(45) Date of Patent: May 8, 2012

(54) ELECTROSTATIC ACTUATOR APPARATUS

(75) Inventor: Tamio Ikehashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 12/817,336

(22) Filed: Jun. 17, 2010

(65) Prior Publication Data

US 2011/0199147 A1    Aug. 18, 2011

(30) Foreign Application Priority Data

Feb. 16, 2010   (JP) ................................ 2010-031820

(51) Int. Cl.
     *G05F 1/10*      (2006.01)
     *H01G 5/00*      (2006.01)

(52) U.S. Cl. ........ 327/536; 361/207; 361/271; 361/277; 200/181

(58) Field of Classification Search .................. 327/427, 327/434, 536, 537; 361/207, 271, 272, 277, 361/280, 281; 310/309; 200/181

See application file for complete search history.

(56) References Cited

U.S. PATENT DOCUMENTS

| | | | |
|---|---|---|---|
| 6,750,589 B2 * | 6/2004 | Cabuz | 310/309 |
| 6,829,132 B2 * | 12/2004 | Martin et al. | 361/278 |
| 6,853,476 B2 * | 2/2005 | Martin et al. | 359/290 |
| 7,751,173 B2 * | 7/2010 | Ikehashi et al. | 361/271 |
| 7,834,681 B2 * | 11/2010 | Suzuki | 327/536 |
| 8,013,667 B2 * | 9/2011 | Ikehashi | 327/536 |
| 8,035,949 B2 * | 10/2011 | Miyano | 361/271 |
| 2009/0121662 A1 * | 5/2009 | Miyazaki | 318/116 |
| 2011/0193501 A1 * | 8/2011 | Ikehashi | 318/116 |

FOREIGN PATENT DOCUMENTS

| | | |
|---|---|---|
| JP | 07-160215 | 6/1995 |
| JP | 2004-336904 | 11/2004 |
| JP | 2006-123110 | 5/2006 |

* cited by examiner

*Primary Examiner* — Patrick O Neill

(74) *Attorney, Agent, or Firm* — Turocy & Watson, LLP

(57) ABSTRACT

According to one embodiment, an electrostatic actuator apparatus includes a first voltage generation circuit configured to generate a first voltage, a first switch connected between the first voltage generation circuit and a first node, a second voltage generation circuit configured to generate a second voltage, a second switch connected between the second voltage generation circuit and a second node, a capacitor connected between the first node and the second node, an electrostatic actuator having a drive electrode connected to the first node, and a control circuit configured to perform an operation of sequentially turning on the first switch, turning off the first switch and turning on the second switch when the electrostatic actuator is driven.

16 Claims, 14 Drawing Sheets

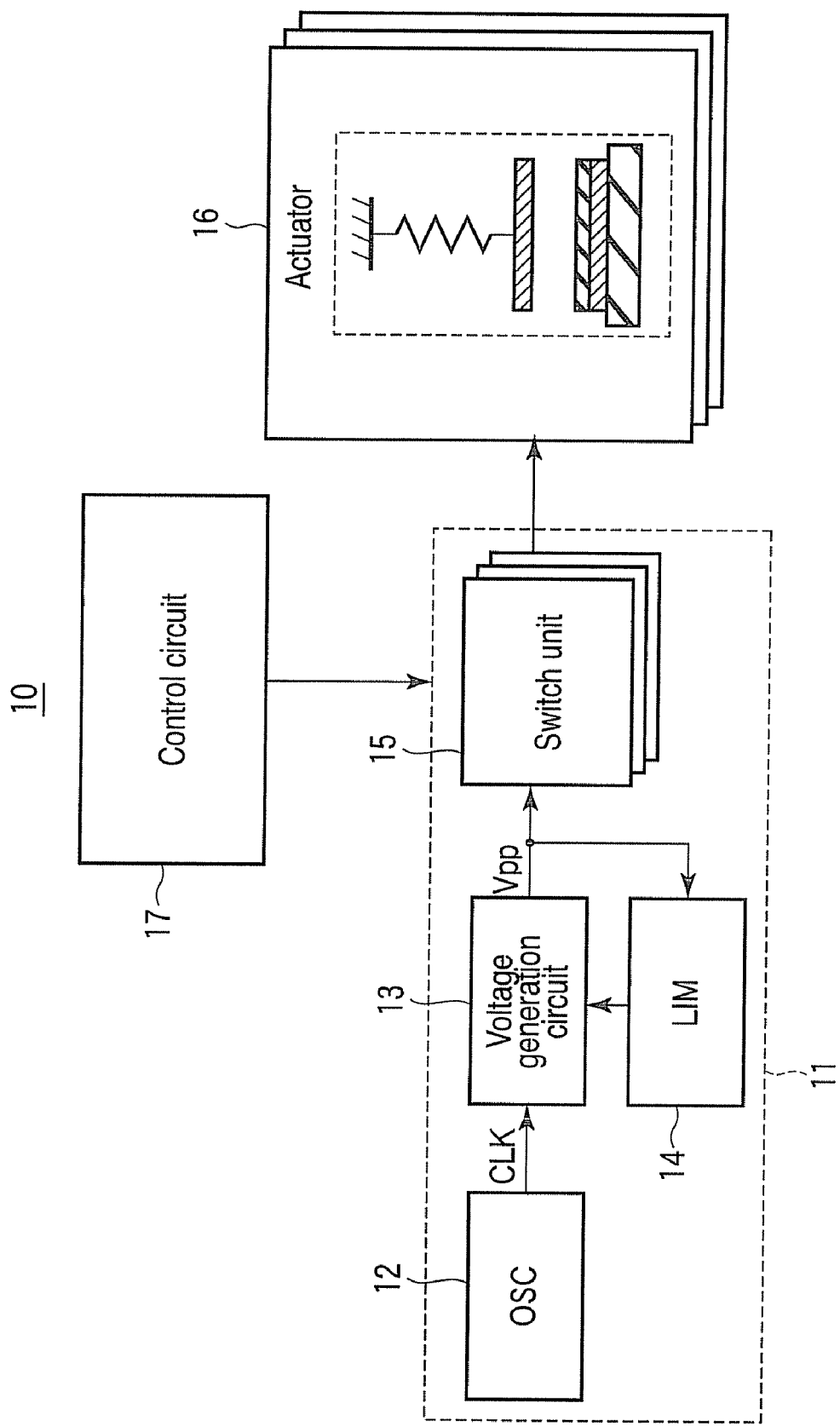
F I G. 1

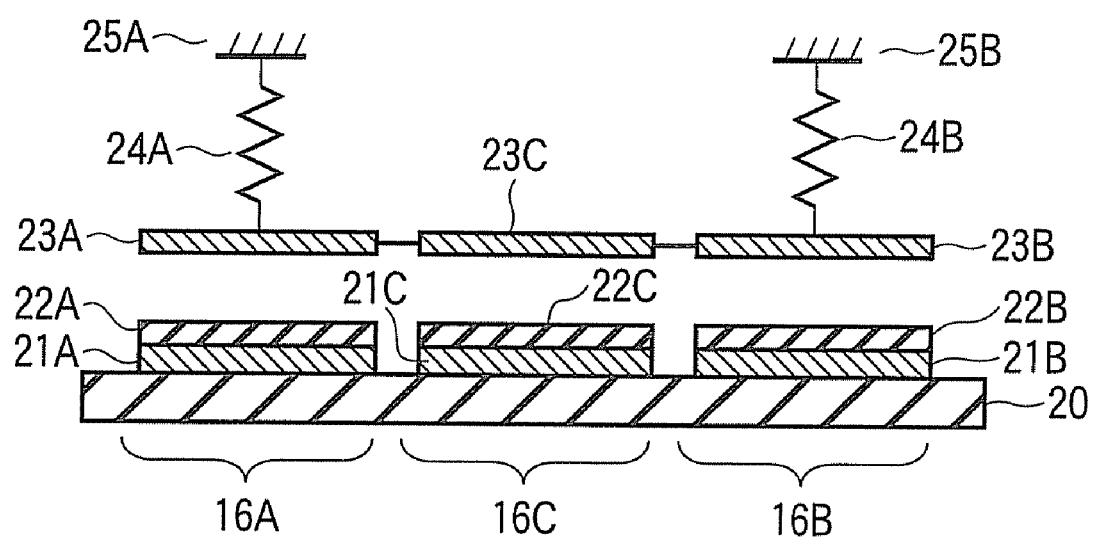
F I G. 3

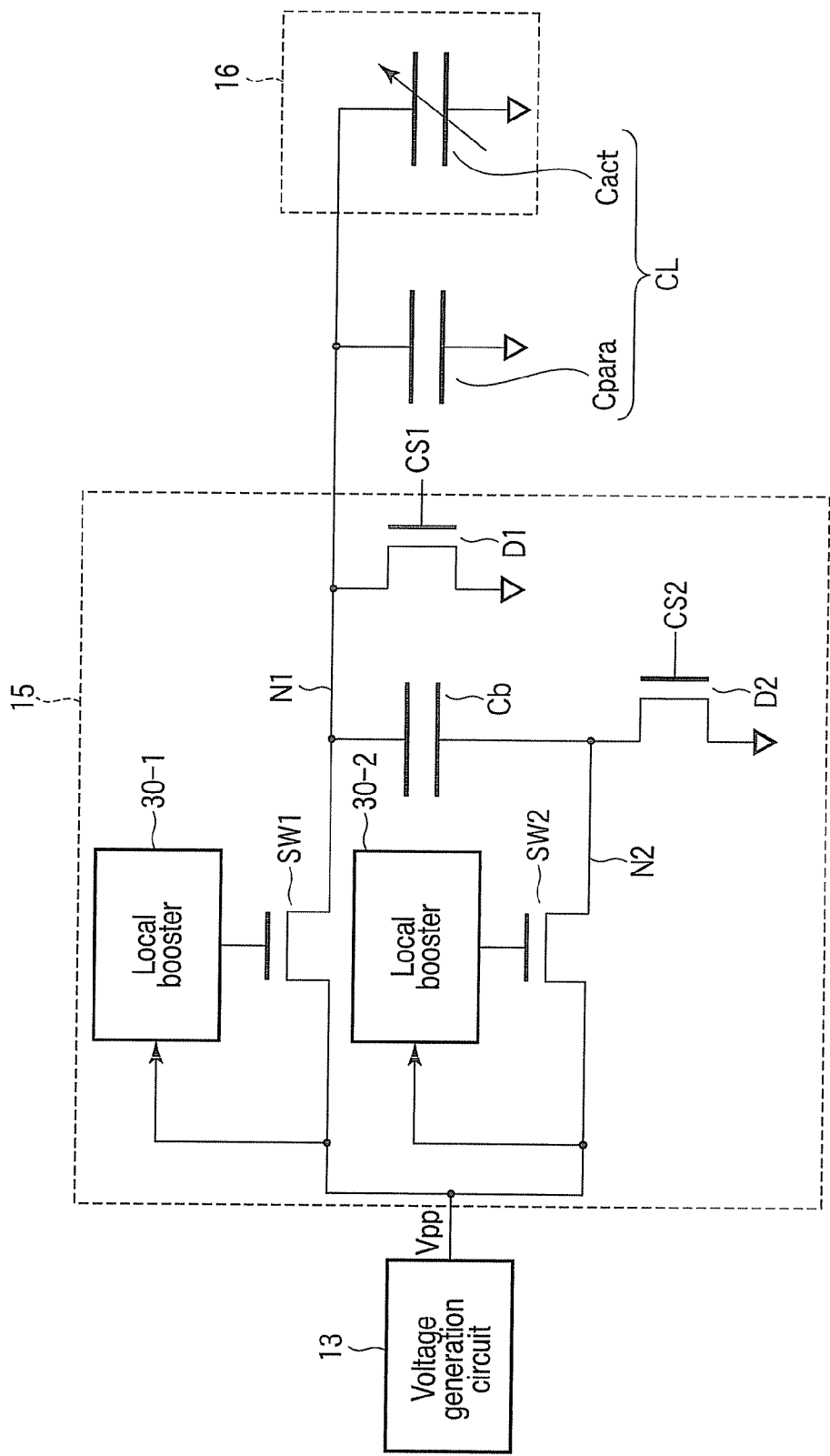
F I G. 5

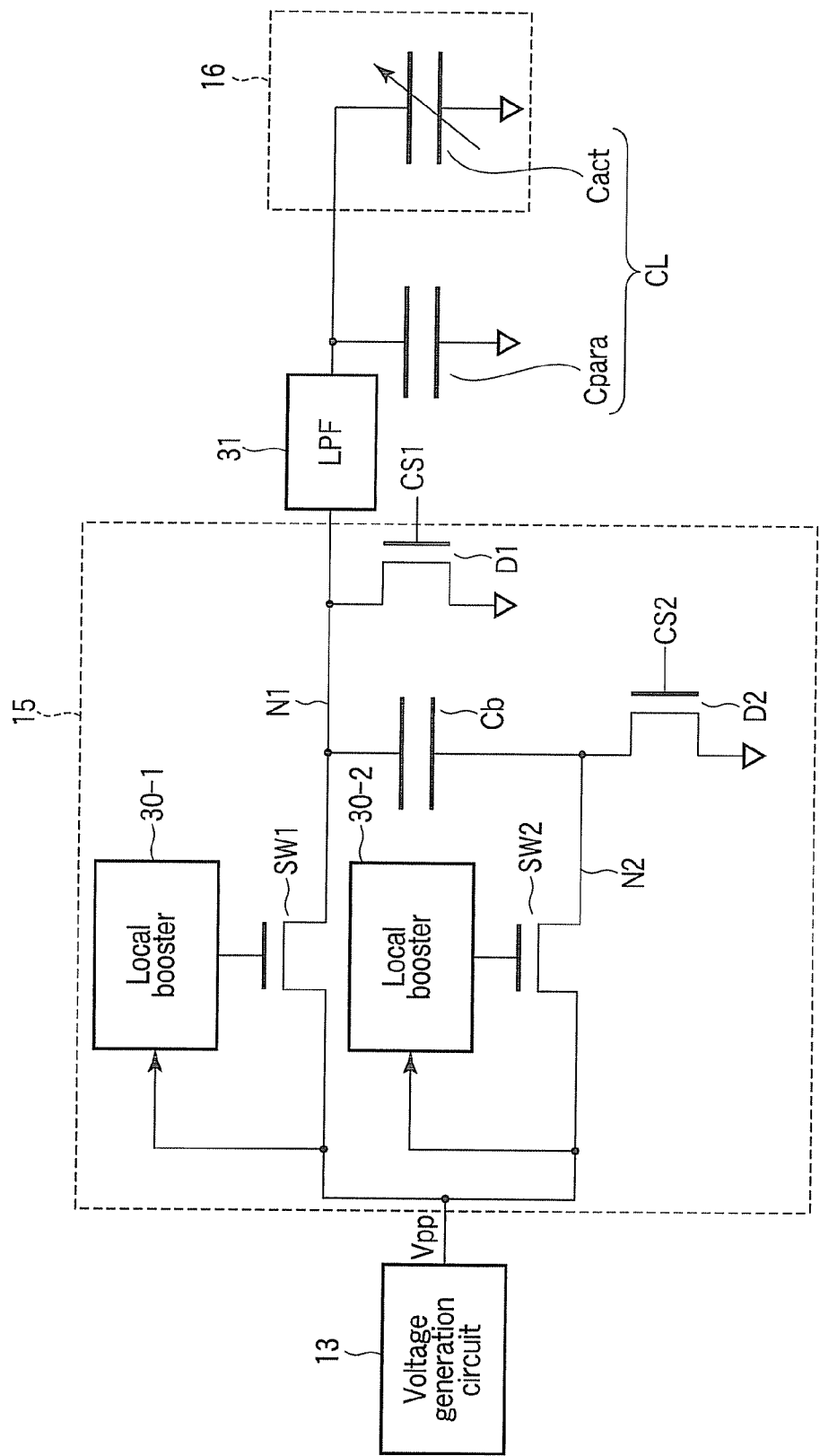
F I G. 6

(a) Up state (b) Down state

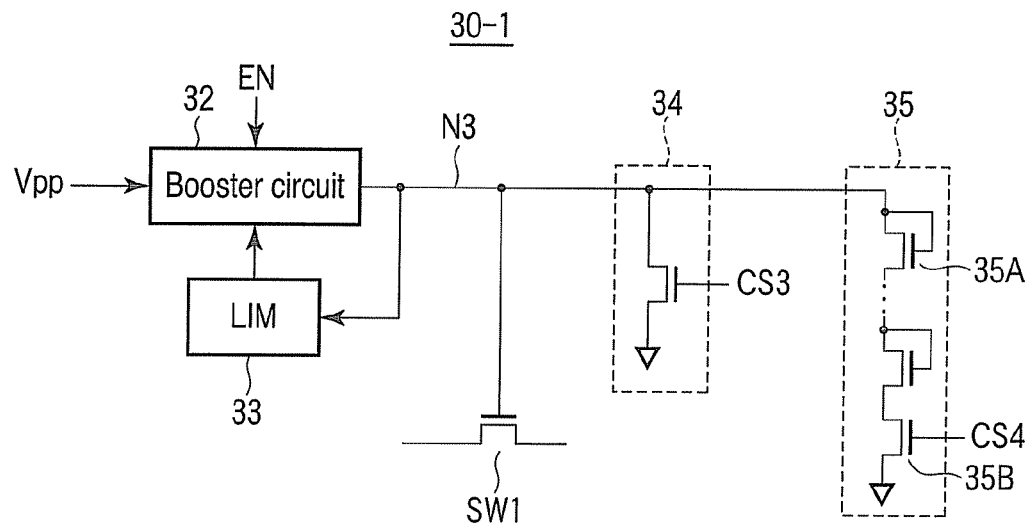
F I G. 10
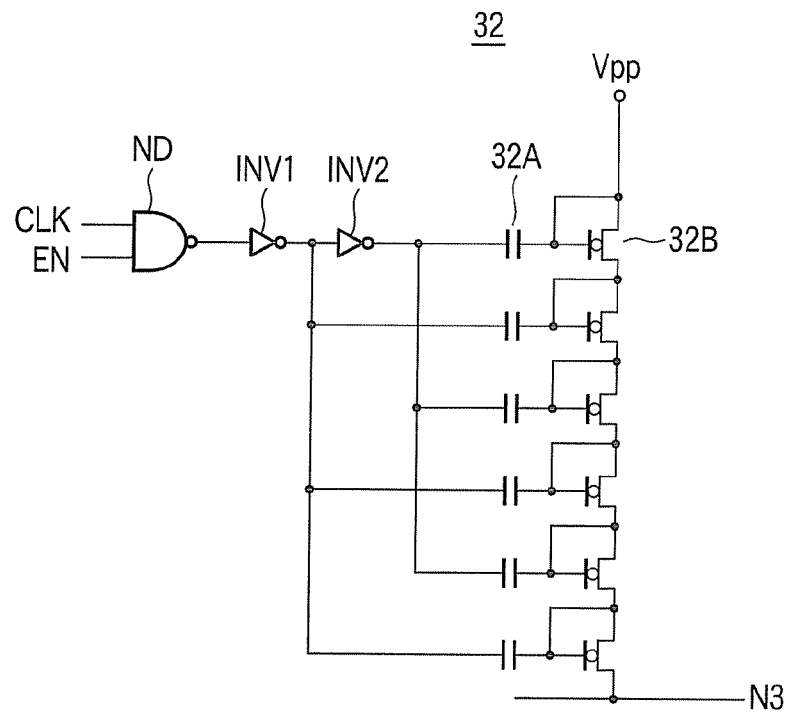
F I G. 11

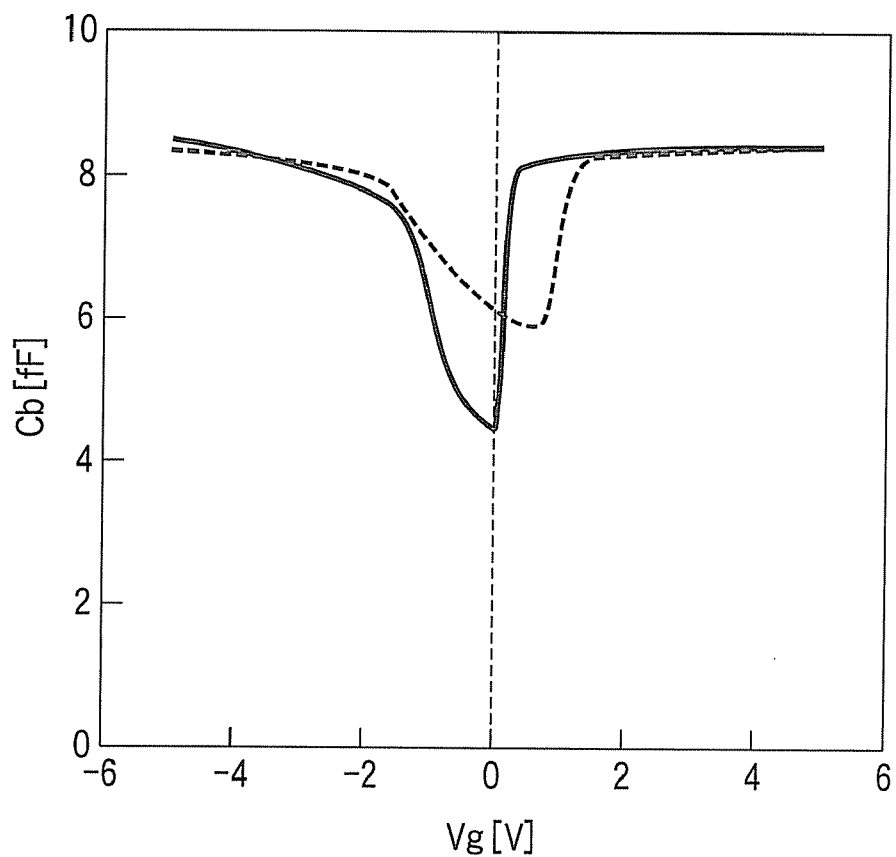
F I G. 16
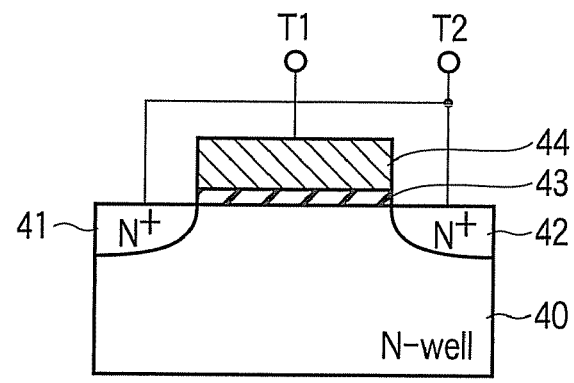
F I G. 17

US 8,174,306 B2

ELECTROSTATIC ACTUATOR APPARATUS

CROSS-REFERENCE TO RELATED APPLICATIONS

This application is based upon and claims the benefit of priority from Japanese Patent Application No. 2010-031820, filed Feb. 16, 2010; the entire contents of which are incorporated herein by reference.

FIELD

Embodiments described herein relate generally to an electrostatic actuator apparatus.

BACKGROUND

Radio frequency (RF) micro-electromechanical systems (MEMS) variable capacitors and RF-MEMS switches utilizing an MEMS technique are developed and electrostatic actuators are used in the MEMS variable capacitors and MEMS switches (for example, JP 2006-123110).

An actuation voltage of the electrostatic actuator is generated by use of a booster circuit provided in a semiconductor device (for example, JP H7-160215 and JP 2004-336904). In order to drive the electrostatic actuator, for example, it is required to use a high voltage of 10 V or more. It takes a long time for the booster circuit to generate the high voltage and, as a result, the switching speed of the MEMS is lowered. Further, the circuit area of the booster circuit that generates the high voltage becomes large and the manufacturing cost will become high.

When the electrostatic actuator is driven by use of the high voltage, stiction due to charging increases and a fault tends to occur. Therefore, it is desired to generate a high voltage required for driving the electrostatic actuator in a short time and make it difficult to cause charging.

BRIEF DESCRIPTION OF THE DRAWING

FIG. 1 is a block diagram showing the configuration of an electrostatic actuator apparatus 10 according to a first embodiment.

FIG. 3 is a cross-sectional view showing the structure of a variable capacitor device 26.

FIG. 5 is a circuit diagram showing an example of the concrete configuration of the switch unit 15.

FIG. 6 is a circuit diagram showing another example of the configuration of the electrostatic actuator apparatus 10.

FIG. 10 is a circuit block diagram showing the configuration of a local booster 30-1 shown in FIG. 5.

FIG. 11 is a circuit diagram showing an example of the configuration of a booster circuit 32.

FIG. 16 is a graph showing the characteristics of a gate capacitor Cb.

FIG. 17 is a cross-sectional view showing the structure of a MOS capacitor Cb.

DETAILED DESCRIPTION

Figure 2:
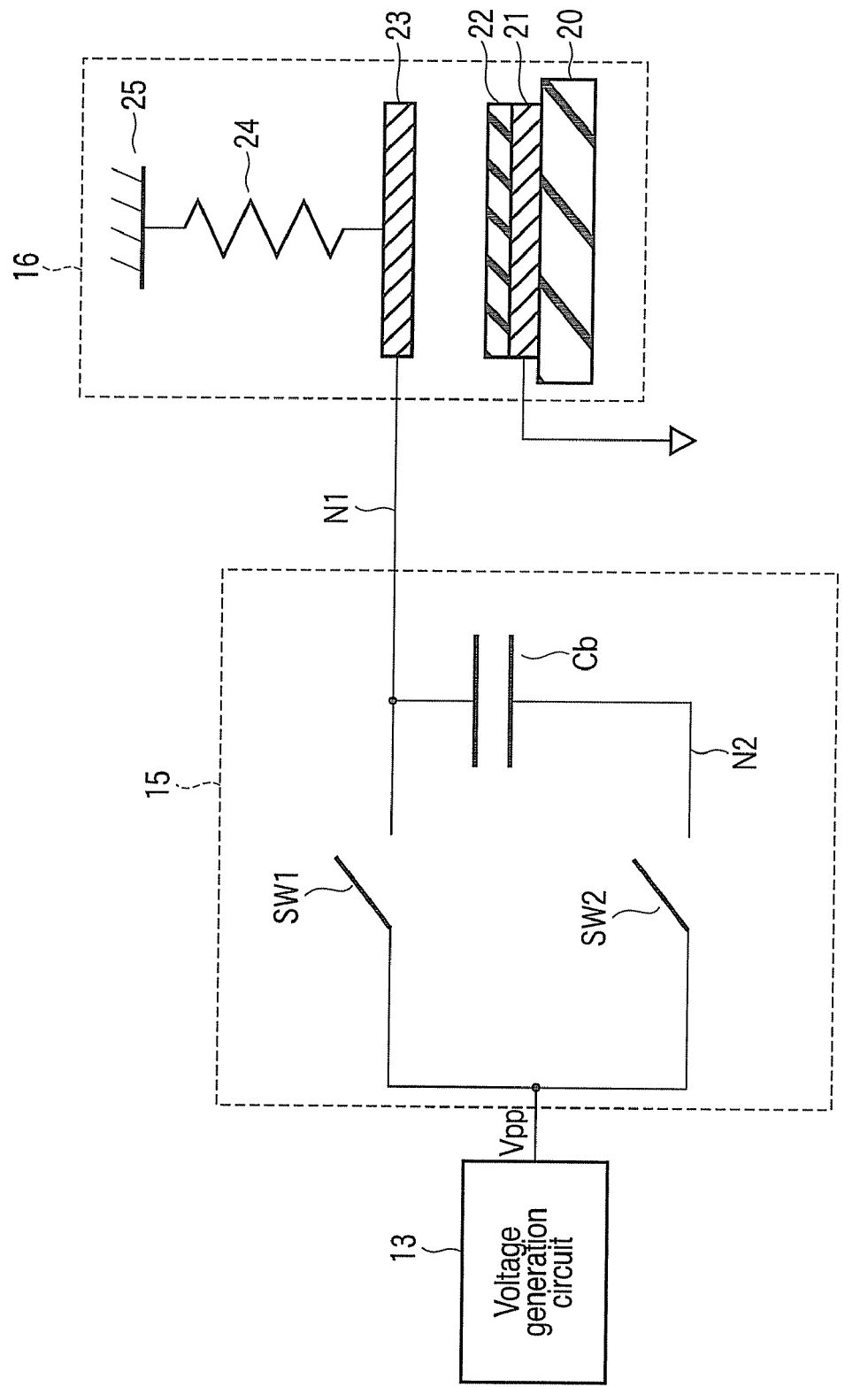
FIG. 2 is a schematic diagram showing the configuration of one switch unit 15 and one electrostatic actuator 16.

In general, according to one embodiment, there is provided an electrostatic actuator apparatus comprising: a first voltage generation circuit configured to generate a first voltage; a first switch connected between the first voltage generation circuit and a first node; a second voltage generation circuit configured to generate a second voltage; a second switch connected between the second voltage generation circuit and a second node; a capacitor connected between the first node and the second node; an electrostatic actuator having a drive electrode connected to the first node; and a control circuit configured to perform an operation of sequentially turning on the first switch, turning off the first switch and turning on the second switch when the electrostatic actuator is driven.

The embodiments will be described hereinafter with reference to the accompanying drawings. In the description which follows, the same or functionally equivalent elements are denoted by the same reference numerals, to thereby simplify the description.

[First Embodiment]

FIG. 1 is a block diagram showing the configuration of an electrostatic actuator apparatus 10 according to a first embodiment. The electrostatic actuator apparatus 10 comprises n (n is an integer greater than zero) electrostatic actuators 16, a drive circuit 11 that drives the electrostatic actuators 16 and a control circuit 17 that controls the operation of the drive circuit 11. The drive circuit 11 comprises an oscillator (OSC) 12, voltage generation circuit 13, limiter (LIM) 14 and n (equal to the number of electrostatic actuators 16) switch units 15. The drive circuit 11 and electrostatic actuators 16 are formed on the same substrate, for example.

For example, the voltage generation circuit 13 is configured by a booster circuit and boosts power supply voltage Vdd to generate voltage Vpp that is higher than power supply voltage Vdd. The booster circuit is configured by a charge pump, for example. The charge pump performs a pump operation by using a clock CLK supplied from the oscillator 12.

The limiter 14 is connected to the voltage generation circuit 13. The limiter 14 prevents an output voltage of the voltage generation circuit 13 from becoming higher than a preset voltage. Thus, the voltage generation circuit 13 can output a stable voltage.

FIG. 2 is a schematic diagram showing the configuration of one switch unit 15 and one electrostatic actuator 16.

For example, the electrostatic actuator 16 comprises a first electrode 21 provided on an insulating substrate 20, an insulating film 22 formed on the first electrode 21 and a second electrode 23 that is provided above the insulating film 22 and is vertically movable. The second electrode 23 is connected to a fixed portion 25 via an elastic body (for example, a spring)

24. The insulating substrate 20 is configured by an insulating layer formed on a silicon substrate or glass substrate. It is only required for the insulating film 22 to play a role of preventing the first electrode 21 and second electrode 23 from being made to electrically contact each other. Therefore, it is sufficient to provide the insulating film 22 between the first electrode 21 and the second electrode 23. For example, the insulating film 22 may be provided only on the lower surface of the second electrode 23 or formed on both of the upper surface of the first electrode 21 and the lower surface of the second electrode 23.

The first electrode 21 is grounded, that is, ground voltage Vss is applied to the first electrode 21. The second electrode 23 is connected to the switch unit 15 via a node N1. Therefore, the second electrode 23 can vertically move according to a voltage applied thereto.

The electrostatic actuator may configure a part of a variable capacitor device 26 shown in FIG. 3, for example. A first electrostatic actuator 16A is configured by a first electrode 21A, insulating film 22A, second electrode 23A, spring 24A and fixed portion 25A. A second electrostatic actuator 16B is configured by a first electrode 21B, insulating film 22B, second electrode 23B, spring 24B and fixed portion 25B. A variable capacitor 16C comprises a first electrode 21C formed on the substrate 20, an insulating film 22C formed on the first electrode 21C and a second electrode 23C that is provided above the insulating film 22 and is vertically movable.

Both sides of the second electrode 23C are fixed on the second electrodes 23A and 23B with insulating layers disposed therebetween and can vertically move according to the movement of the second electrodes 23A and 23B. Thus, the first electrode 21C, insulating film 22C and second electrode 23C may function as a variable capacitor. The electrostatic actuator can be applied to a device other than the variable capacitor device and can be applied to a switch, for example.

The switch unit 15 comprises switches SW1 and SW2 and a capacitor Cb. One end of switch SW1 is connected to the output terminal of the voltage generation circuit 13 and the other end of switch SW1 is connected to the first electrode of the capacitor Cb via node N1. One end of switch SW2 is connected to the output terminal of the voltage generation circuit 13 and the other end of switch SW2 is connected to the second electrode of the capacitor Cb via a node N2. The switch unit 15 controls the operation of switches SW1 and SW2 to apply an actuation voltage to the second electrode 23 of the electrostatic actuator 16.

Figure 4:
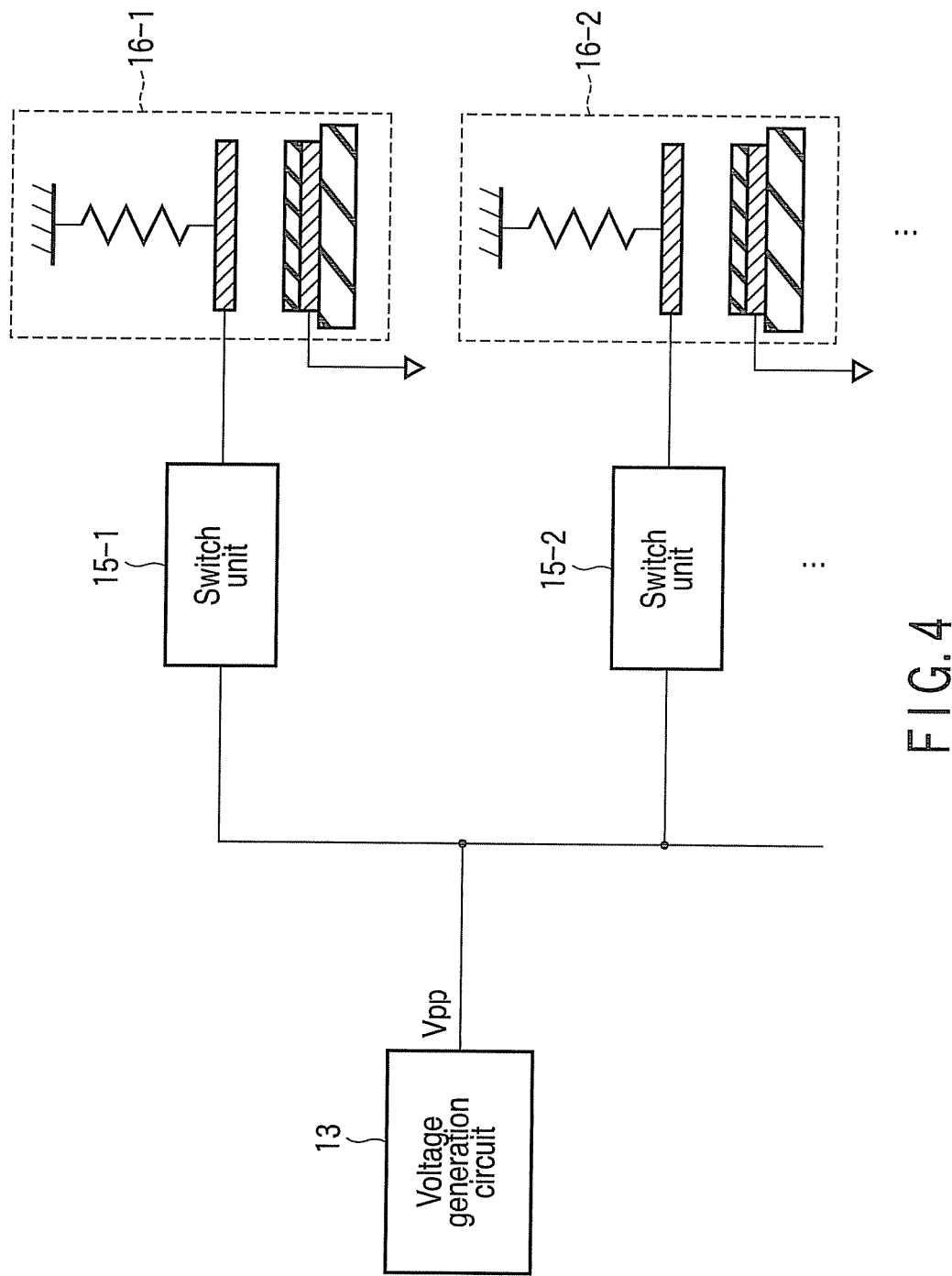
FIG. 4 is a schematic diagram showing a plurality of electrostatic actuators 16.

The number of electrostatic actuators 16 can of course be set to a plural number. FIG. 4 is a schematic diagram showing a plurality of electrostatic actuators 16. In this case, the electrostatic actuator apparatus 10 comprises a plurality of switch units 15-1 to 15-$n$ corresponding in number to a plurality of electrostatic actuators 16-1 to 16-$n$. One switch unit 15 has a role of applying an actuation voltage only to a corresponding one of the electrostatic actuators 16. The voltage generation circuit 13 is provided only one for a plurality of electrostatic actuators 16-1 to 16-$n$. In the following explanation, the configuration and operation of one electrostatic actuator 16 are explained, but the configuration and operation of the other electrostatic actuators are the same as those described below.

FIG. 5 is a circuit diagram showing an example of the concrete configuration of the switch unit 15. As switches SW1 and SW2, metal oxide semiconductor field effect transistors (MOSFETs) for high withstanding voltage are used and, for example, N-channel MOSFETs (NMOSFETs) are used.

The drain of the NMOSFET (SW1) is connected to the output terminal of the voltage generation circuit 13 and the source of the NMOSFET (SW1) is connected to the first electrode of the capacitor Cb via node N1. The gate voltage of the NMOSFET (SW1) is controlled by a local booster 30-1.

The drain of the NMOSFET (SW2) is connected to the output terminal of the voltage generation circuit 13 and the source of the NMOSFET (SW2) is connected to the second electrode of the capacitor Cb via node N2. The gate voltage of the NMOSFET (SW2) is controlled by a local booster 30-2.

Node N1 is connected to a first discharging circuit D1. The first discharging circuit D1 discharges node N1 based on a control signal CS1 from the control circuit 17. Node N2 is connected to a second discharging circuit D2. The second discharging circuit D2 discharges node N2 based on a control signal CS2 from the control circuit 17. Each of the first discharging circuit D1 and second discharging circuit D2 is configured by an N-channel MOSFET, for example.

A capacitor Cpara connected to node N1 represents a parasitic capacitance associated with an interconnection and Cact represents the capacitance of the electrostatic actuator 16. A combination of Cpara and Cact is expressed by CL.

Figure 7:
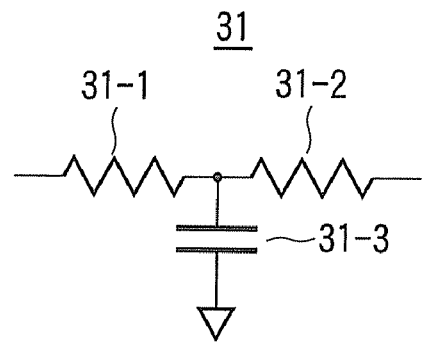
FIG. 7 is a circuit diagram showing an example of the configuration of a low-pass filter 31.

As shown in FIG. 6, a low-pass filter (LPF) 31 may be inserted between the switch unit 15 and the electrostatic actuator 16. FIG. 7 is a circuit diagram showing an example of the configuration of the low-pass filter 31. The low-pass filter 31 comprises two resistors 31-1 and 31-2 and a capacitor 31-3. Since noise and ripple from the voltage generation circuit 13 can be reduced by using the low-pass filter 31, the operation of the electrostatic actuator 16 can be stabilized.

In this embodiment, nothing but the resistance element is connected between the switch unit 15 and the electrostatic actuator 16, more specifically, between the first electrode of the capacitor Cb and the electrostatic actuator 16. This is a necessary condition to transmit an output voltage from the switch unit 15 to the electrostatic actuator 16 as it is.

(Operation)

Next, the operation of the electrostatic actuator apparatus 10 with the above configuration is explained. The electrostatic actuator 16 can selectively take an up state and down state according to a voltage applied to the second electrode 23. When the output voltage of the switch unit 15 becomes higher than or equal to an actuation voltage of the electrostatic actuator 16, the electrostatic actuator 16 transits from the up state to the down state.

Figure 8:
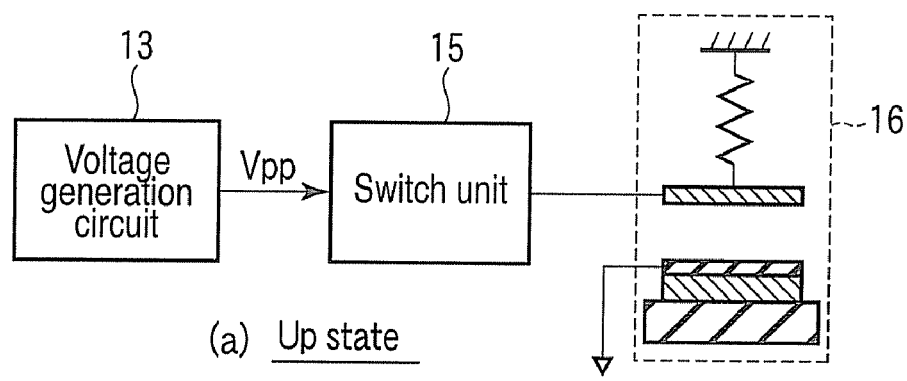
FIG. 8 is a schematic diagram showing the up state and down state of the electrostatic actuator 16.
Figure 8:
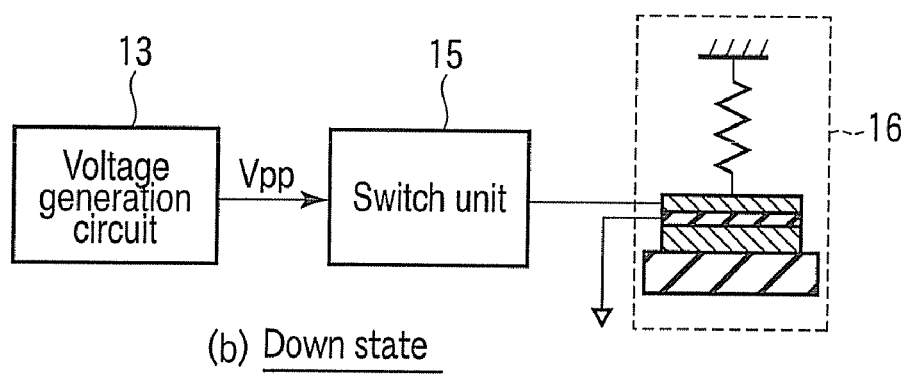

FIG. 8 is a schematic diagram showing the up state and down state of the electrostatic actuator 16. The up state is a state in which the electrostatic actuator 16 is not driven and the voltage of the second electrode 23 in the up state is not lower than ground voltage Vss and is lower than a pull-in voltage. The pull-in voltage is a voltage required for the second electrode 23 to be driven downwardly and is a voltage at which electrostatic attraction that attracts the second electrode 23 towards the first electrode 21 becomes larger than the restoring force of the spring 24.

In order to drive the electrostatic actuator 16, that is, in order to change the state from the up state to the down state, switches SW1 and SW2 are operated in the following sequence. The operation of switches SW1 and SW2 is controlled by the control circuit 17.

(1) SW1: On
(2) SW1: Off
(3) SW2: On

Figure 9:
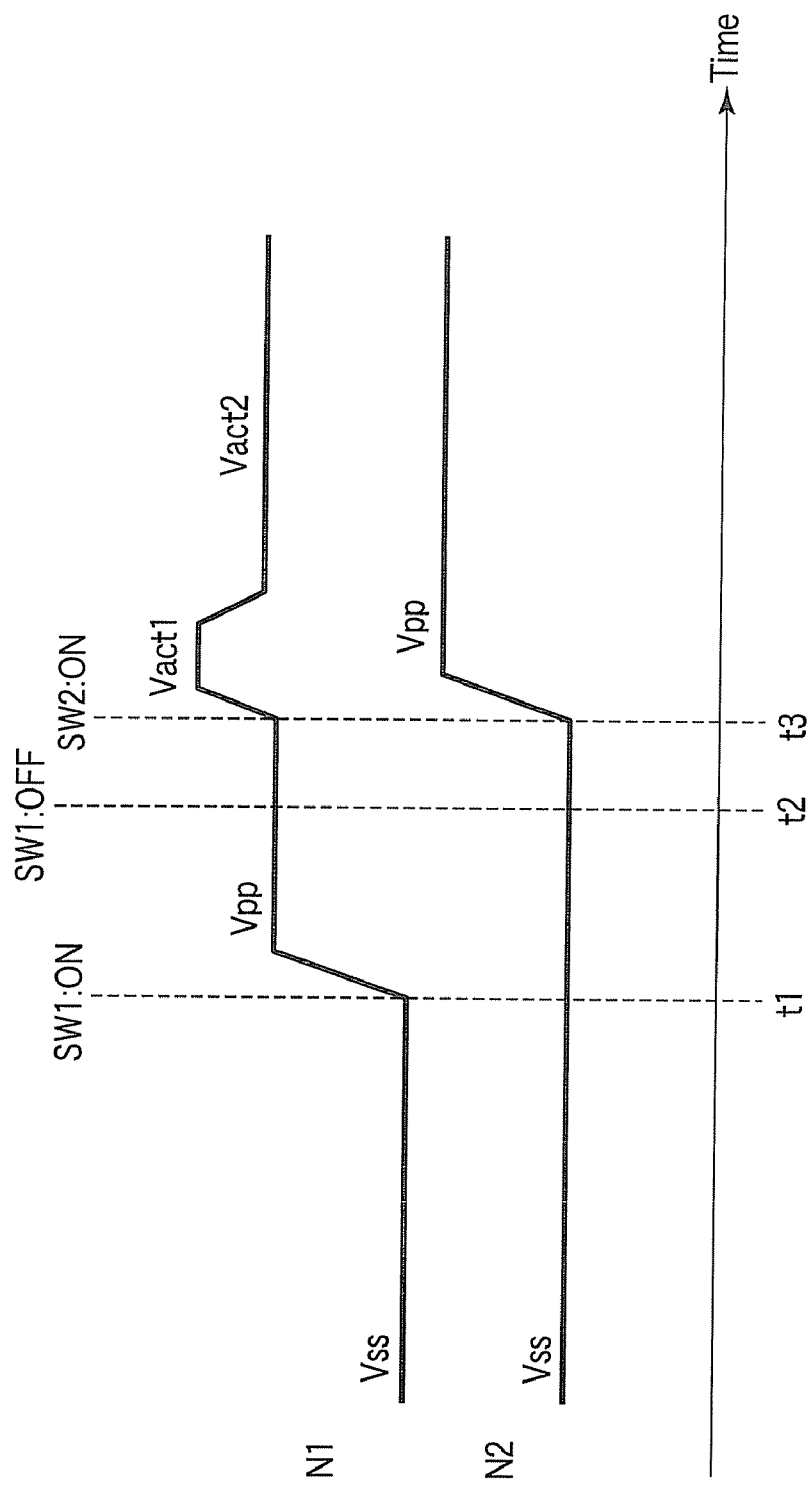
FIG. 9 is a timing chart for illustrating voltages applied to the electrostatic actuator 16.

FIG. 9 is a timing chart for illustrating voltages applied to the electrostatic actuator 16. In FIG. 9, voltages of nodes N1 and N2 in FIG. 5 are shown. It is supposed that an output voltage of the voltage generation circuit 13 is set to Vpp and capacitances of the electrostatic actuator 16 in the up state and down state are respectively set to Cact[up] and Cact[down].

If switch SW1 is turned on, voltage Vpp is applied to the electrostatic actuator 16. The voltage Vpp is set higher than or equal to a hold voltage of the electrostatic actuator 16 and lower than a pull-in voltage of the electrostatic actuator 16. Therefore, at this time point, the electrostatic actuator 16 is kept in the up state. The hold voltage represents the voltage required for maintaining a state set when the second electrode 23 is driven downwardly and made to contact the insulating film 22. The hold voltage is lower than the pull-in voltage.

Next, after switch SW1 is turned off, switch SW2 is turned on. If voltage Vpp is applied to node N2, the voltage of node N1 is boosted to actuation voltage Vact1 that is higher than the pull-in voltage and voltage Vpp due to the capacitive coupling of the capacitor Cb. Actuation voltage Vact1 is given by the following equation.

$$Vact1 = \{(2Cb + Cpara + Cact[up])/(Cb + Cpara + Cact[up])\} \cdot Vpp$$

If Vpp=22 V and Cb=CL (=Cpara+Cact), then Vact1=33 V. The electrostatic actuator 16 can be set in the down state by driving the electrostatic actuator 16 by use of voltage Vact1. According to the above system, the electrostatic actuator 16 can be driven by the voltage generation circuit 13 that generates voltage Vpp lower than voltage Vact1. Therefore, the area of the voltage generation circuit 13 can be reduced in comparison with a case wherein actuation voltage Vact1 is directly generated. Further, since it is only required for the voltage generation circuit 13 to generate voltage Vpp lower than actuation voltage Vact1, the boosting time can also be reduced.

Further, according to this system, charging of the electrostatic actuator 16 can be suppressed. Charging represents a phenomenon where charges are accumulated on the insulating film 22 when the electrostatic actuator 16 repeatedly performs the drive operation and the second electrode 23 becomes difficult to separate from the insulating film 22 due to the presence of charges. The influence of the charging phenomenon becomes larger as the actuation voltage becomes higher. The reason why the charging phenomenon can be suppressed is explained below.

The state of the electrostatic actuator 16 transits from the up state to the down state when actuation voltage Vact1 is applied thereto, but the charge amount of node N1 before and after the transition can be maintained. At this time, the capacitance of the electrostatic actuator 16 increases from Cact[up] to Cact[down]. As a result, the voltage of node N1 decreases from Vact1 to Vact2. Voltage Vact2 is set not lower than a hold voltage of the electrostatic actuator 16 and is set lower than voltage Vact1. Voltage Vact2 is given by the following equation.

$$Vact2 = \{(Cb + Cpara + Cact[up])/Cb + Cpara + Cact[down]\} \cdot Vact1$$

As a result, an electric field applied to the insulating film 22 of the electrostatic actuator 16 is reduced and the charging phenomenon is suppressed. When the electrostatic actuator 16 is restored to the up state, nodes N1 and N2 are respectively discharged by the first discharging circuit D1 and second discharging circuit D2.

In order to realize the operation in FIG. 9, it is necessary to directly apply the output voltage (actuation voltage) of the switch unit 15 to the electrostatic actuator 16 without dropping the output voltage. Therefore, an element (for example, a switch or power source) that changes the output voltage of the switch unit 15 is not inserted between the switch unit 15 and the electrostatic actuator 16. The low-pass filter 31 that includes a resistance element is a circuit that reduces voltage noise and ripple. Even when the low-pass filter 31 is connected between the switch unit 15 and the electrostatic actuator 16, the output voltage of the switch unit 15 can be directly applied to the electrostatic actuator 16. In other words, an element that changes the voltage and is different from the resistance element is not inserted between the switch unit 15 and the electrostatic actuator 16.

When switch SW2 is turned on and the voltage of node N1 is boosted to actuation voltage Vact1, a large potential difference is applied between the gate and source of the NMOSFET configuring switch SW1. If the above operation is repeatedly performed, the gate insulating film of the NMOSFET (SW1) is degraded. In order to prevent this, the gate voltage of the NMOSFET (SW1) is not set to zero, but to an intermediate voltage higher than zero and lower than voltage Vpp when switch SW2 is turned on. An example of the configuration of the local booster 30-1 that realizes the above operation is explained. FIG. 10 is a circuit block diagram showing the configuration of the local booster 30-1 shown in FIG. 5. The configuration of the local booster 30-2 is the same as that shown in FIG. 10.

The local booster 30-1 includes a booster circuit 32, limiter (LIM) 33, first discharging circuit 34 and second discharging circuit 35. The booster circuit 32 generates a gate voltage that turns on the NMOSFET configuring switch SW1 by use of power supply voltage Vdd. The output terminal of the booster circuit 32 is connected to switch SW1 via a node N3. The booster circuit 32 is configured by a charge pump, for example. The charge pump performs a pump operation by using a clock CLK supplied from the oscillator 12.

The limiter 33 is connected to the booster circuit 32. The limiter 33 prevents an output voltage of the booster circuit 32 from becoming higher than a preset voltage. Thus, the booster circuit 32 can output a stable voltage.

The first discharging circuit 34 is connected to node N3. The first discharging circuit 34 is configured by an NMOSFET. The drain of the NMOSFET 34 is connected to node N3, the source of the NMOSFET 34 is grounded and a control signal CS3 is supplied from the control circuit 17 to the gate of the NMOSFET 34. The first discharging circuit 34 discharges node N3 to approximately 0 V.

The second discharging circuit 35 is connected to node N3. The second discharging circuit 35 includes a diode group having a plurality of diodes 35A serially connected (cascade-connected) and an NMOSFET 35B acting as a switching element. For example, each of the diodes 35A is configured by diode-connecting an NMOSFET. The anode of the first-stage diode 35A is connected to node N3.

The drain of the NMOSFET 35B is connected to the cathode of the final-stage diode 35A, the source of the NMOSFET 35B is grounded and a control signal CS4 is supplied from the control circuit 17 to the gate of the NMOSFET 35B. The second discharging circuit 35 discharges node N3 to a voltage that is almost equal to a voltage corresponding to voltage drops of the plural diodes 35A. Therefore, by setting the number of diodes 35A to an optimum value, the voltage of node N3 can be discharged to a desired voltage higher than zero.

FIG. 11 is a circuit diagram showing an example of the configuration of the booster circuit 32. A clock CLK is supplied from the oscillator 12 to the first input terminal of a NAND gate ND and an enable signal EN is supplied from the control circuit 17 to the second input terminal of the NAND gate ND. The output terminal of the NAND gate ND is connected to the input terminal of an inverter INV1. The output terminal of inverter INV1 is connected to the input terminal of an inverter INV2.

Inverter INV1 outputs a clock CLK while the enable signal EN is high. Inverter INV2 outputs a clock bCLK obtained by inverting the clock CLK while the enable signal EN is high.

The first electrode of a capacitor 32A is connected to the anode of a diode 32B. The cathode of the diode 32B is connected to the anode of a next-stage diode. With this relation maintained, a plurality of units each configured by one capacitor 32A and one diode 32B are connected with the diodes 32B serially connected.

For example, the diode 32B is configured by diode-connecting an I (intrinsic)-type NMOSFET. Since the threshold voltage of the I-type NMOSFET is approximately zero, the voltage drop of the diode 32B can be suppressed to approximately zero.

Voltage Vpp from the voltage generation circuit 13 is applied to the anode of the first-stage diode 32B. The cathode of the final-stage diode 32B is connected to node N3. The plural capacitors 32A are alternately supplied with the clocks CLK and bCLK. As a result, the booster circuit 32 can generate a voltage higher than voltage Vpp by transferring charges stored on the capacitor 32A to the next-stage capacitor.

Next, the operation of the local booster 30-1 with the above configuration is explained. When switch SW1 is turned on, an on-voltage is applied to switch SW1 by the booster circuit 32. Then, when switch SW1 is turned off, node N3 is discharged by the first discharging circuit 34 of the local booster 30-1. As a result, the gate voltage of the NMOSFET of switch SW1 is set to approximately zero and switch SW1 is turned off.

Next, when switch SW2 is turned on, the NMOSFET 35B of the second discharging circuit 35 of the local booster 30-1 is turned on. At this time, the first discharging circuit 34 of the local booster 30-1 is kept off. As a result, node N3 is set to a voltage that is higher than ground voltage Vss by the voltage drops of the plural diodes 35A, for example, approximately 10 V. For example, if Vact1=33 V, the potential difference between the gate and source of the NMOSFET of switch SW1 is set to approximately 23 V and is set to a potential difference that is lower by approximately 10 V than in a case where the gate voltage is set to zero. As a result, degradation in the gate insulating film of switch SW1 can be suppressed.

(Effect)

As described above, in the first embodiment, the switch unit 15 is connected between the voltage generation circuit 13 that generates voltage Vpp and the electrostatic actuator 16 and the switch unit 15 generates actuation voltage Vact1 of the electrostatic actuator 16 that is higher than voltage Vpp. The switch unit 15 comprises the capacitor Cb, switch SW1 connected between the voltage generation circuit 13 and the first electrode of the capacitor Cb, and switch SW2 connected between the voltage generation circuit 13 and the second electrode of the capacitor Cb. When the electrostatic actuator 16 is driven, the operation of sequentially turning on switch SW1, turning off switch SW1 and turning on switch SW2 is performed.

Therefore, according to the first embodiment, actuation voltage Vact1 higher than voltage Vpp generated by the voltage generation circuit 13 can be applied to the electrostatic actuator 16 by the switch unit 15. As a result, the area of the voltage generation circuit 13 can be reduced and the manufacturing cost can be lowered.

Further, it becomes possible to generate actuation voltage Vact1 in an extremely short time. Thus, the switching speed of the electrostatic actuator 16 can be increased.

Further, when the electrostatic actuator 16 is driven, the actuation voltage can automatically be lowered to voltage Vact2 that is lower than voltage Vact1 while the electrostatic actuator 16 is kept in the down state after actuation voltage Vact1 is applied to the electrostatic actuator 16. As a result, the charging phenomenon of the electrostatic actuator 16 can be suppressed and a stiction fault can be reduced.

The potential difference between the gate and source of the NMOSFET of switch SW1 is reduced by the local booster 30-1 while switch SW1 is set off and switch SW2 is set on. As a result, degradation in the gate insulating film of the NMOSFET of switch SW1 can be prevented.

[Second Embodiment]

In the first embodiment, voltages applied to switches SW1 and SW2 are both set to voltage Vpp generated by the voltage generation circuit 13, but the voltages are not limited to this case and a voltage applied to switch SW1 and a voltage applied to switch SW2 may be different from each other. In the second embodiment, a drive circuit 11 comprises a first voltage generation circuit 13-1 and second voltage generation circuit 13-2 that respectively generate different voltages Vpp1 and Vpp2. The first voltage generation circuit 13-1 applies voltage Vpp1 to switch SW1 and the second voltage generation circuit 13-2 applies voltage Vpp2 to switch SW2.

Figure 12:
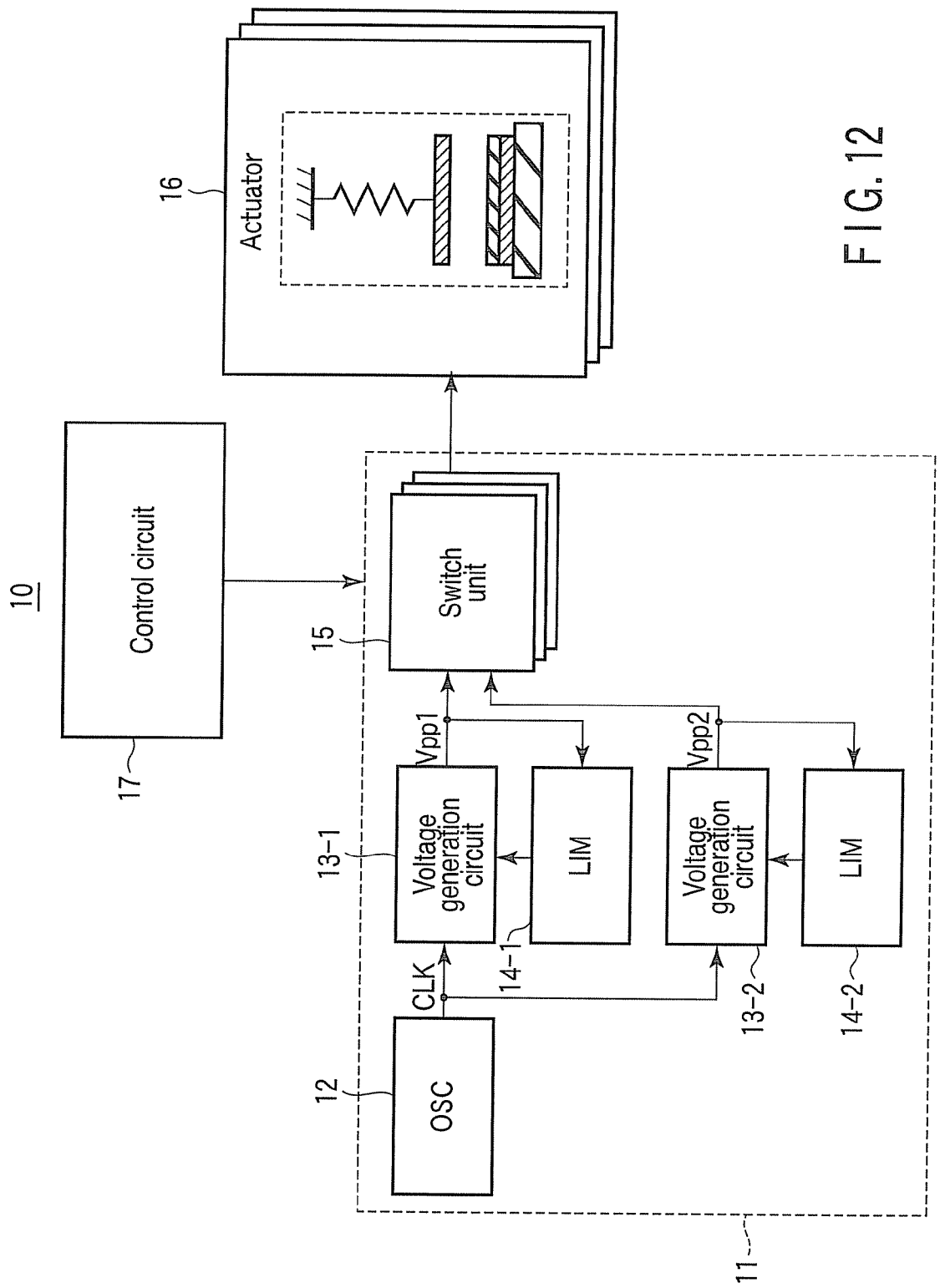
FIG. 12 is a block diagram showing the configuration of an electrostatic actuator apparatus 10 according to a second embodiment.

FIG. 12 is a block diagram showing the configuration of an electrostatic actuator apparatus 10 according to the second embodiment. The drive circuit 11 comprises the first voltage generation circuit 13-1 and second voltage generation circuit 13-2. The first voltage generation circuit 13-1 is connected to a limiter 14-1 and the second voltage generation circuit 13-2 is connected to a limiter 14-2.

For example, the first voltage generation circuit 13-1 is configured by a booster circuit and boosts power supply voltage Vdd to generate voltage Vpp1 higher than power supply voltage Vdd. The second voltage generation circuit 13-2 is configured by a booster circuit and boosts power supply voltage Vdd to generate voltage Vpp2 higher than power supply voltage Vdd.

Figure 13:
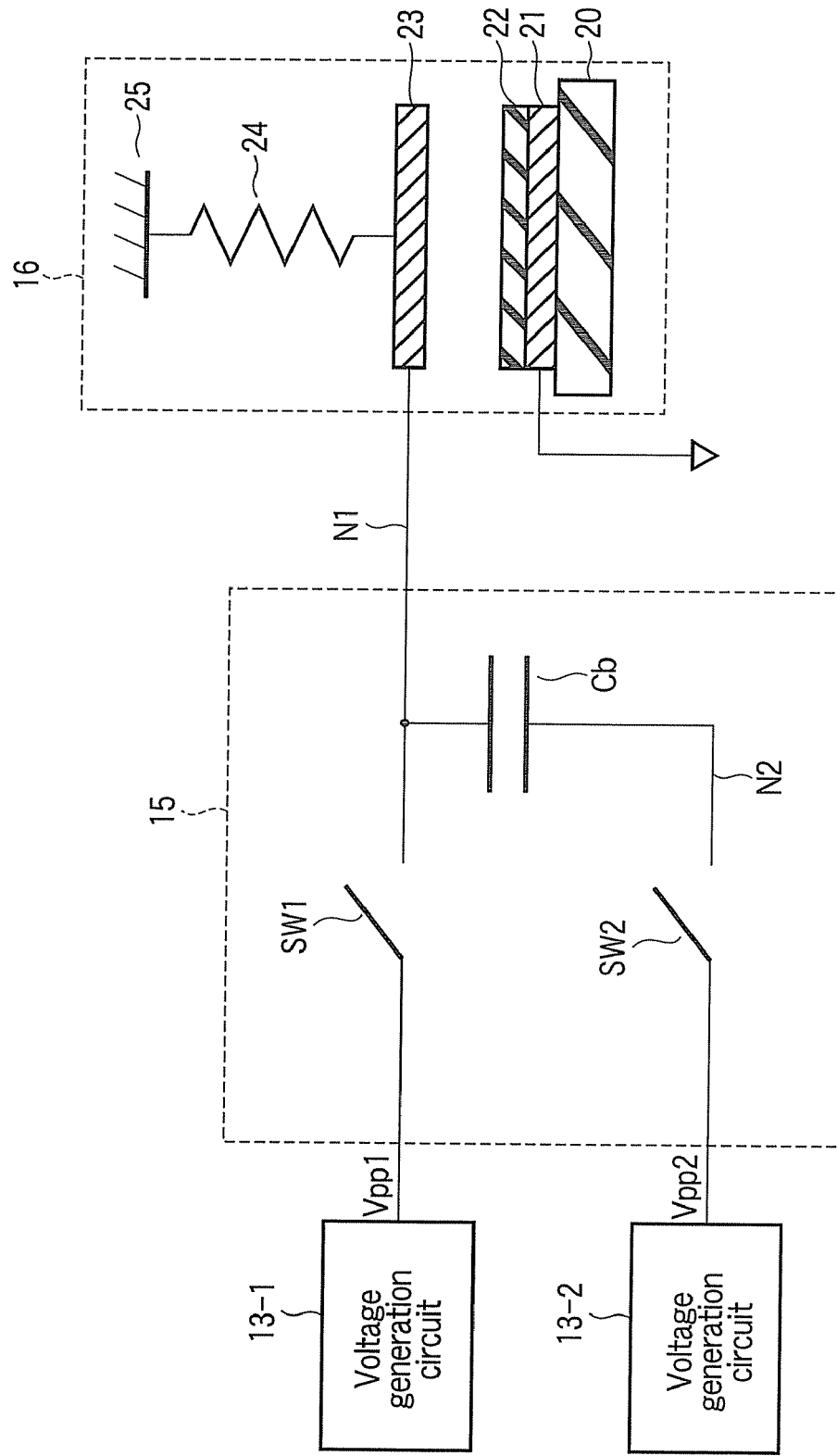
FIG. 13 is a schematic diagram showing the configuration of one switch unit 15 and one electrostatic actuator 16.

FIG. 13 is a schematic diagram showing the configuration of one switch unit 15 and one electrostatic actuator 16. Voltage Vpp1 from the first voltage generation circuit 13-1 is applied to one end of switch SW1. Voltage Vpp2 from the second voltage generation circuit 13-2 is applied to one end of switch SW2. The other configuration is the same as that shown in FIG. 2.

Voltage Vpp1 is set lower than a pull-in voltage of the electrostatic actuator 16 and is set not lower than a hold voltage of the electrostatic actuator 16. Actuation voltage Vact1 is given by the following equation.

$$Vact1 = Vpp1 + \{Cb/(Cb+Cpara+Cact[up])\} \cdot Vpp2$$

The equation for voltage Vact2 is the same as that in the first embodiment. Voltage Vpp2 is set to cause actuation voltage Vact1 to become not lower than the pull-in voltage of the electrostatic actuator 16. Specifically, voltage Vpp2 is given by the following equation. Vpi represents the pull-in voltage of the electrostatic actuator 16.

$$Vpp2 \geq \{(Cb+Cpara+Cact[up])/Cb\} \cdot (Vpi-Vpp1)$$

Thus, even when different voltages are applied to switches SW1 and SW2 while the voltage condition described above is satisfied, the same operation as that of the first embodiment can be realized. Therefore, in the electrostatic actuator apparatus 10 according to the second embodiment, the same effect as that of the first embodiment can be attained.

[Third Embodiment]

In the third embodiment, a first electrode 21 and second electrode 23 of an electrostatic actuator 16 are respectively connected to switch units. The voltages of the first electrode 21 and second electrode 23 are controlled by the two switch units.

Figure 14:
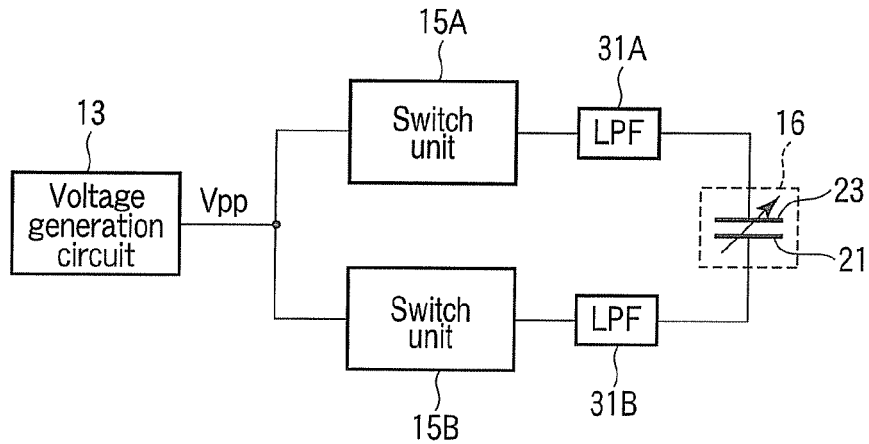
FIG. 14 is a block diagram showing the main portion of an electrostatic actuator apparatus 10 according to a third embodiment.

FIG. 14 is a block diagram showing the main portion of the electrostatic actuator apparatus 10 according to the third embodiment.

The output terminal of a voltage generation circuit 13 is connected to switch units 15A and 15B. The output terminal of the switch unit 15A is connected to the second electrode 23 of the electrostatic actuator 16 via a low-pass filter (LPF) 31A. The output terminal of the switch unit 15B is connected to the first electrode 21 of the electrostatic actuator 16 via a low-pass filter (LPF) 31B. The configuration of the switch units 15A and 15B is the same as that of the switch unit 15 shown in FIG. 5.

Next, the operation of the electrostatic actuator apparatus 10 configured as described above is explained. When voltages Vact1 and Vact2 are applied to the second electrode 23 of the electrostatic actuator 16, the switch unit 15A performs the operation explained in the first embodiment. At this time, the switch unit 15B sets the voltage of the first electrode 21 of the electrostatic actuator 16 to approximately zero. Specifically, the voltage of the first electrode 21 of the electrostatic actuator 16 is set to approximately zero by turning off switches SW1 and SW2 and discharging nodes N1 and N2 by discharging circuits D1 and D2.

Further, when actuation voltages Vact1 and Vact2 are applied to the first electrode 21 of the electrostatic actuator 16, the switch unit 15B performs the operation explained in the first embodiment. At this time, the switch unit 15A sets the voltage of the second electrode 23 of the electrostatic actuator 16 to approximately zero.

Therefore, in the third embodiment, the direction of an electric field between the first electrode 21 and the second electrode 23 can be reversed while the operation of transiting the state of the electrostatic actuator 16 from the up state to the down state is being performed. For example, if an electric field set only in one direction is continuously applied, charges are stored on an insulating film 22 of the electrostatic actuator 16 and a problem of charging occurs. However, in the third embodiment, for example, charges stored on the insulating film 22 can be extracted by changing the direction of an electric field between the first electrode 21 and the second electrode 23 for each preset time. As a result, a charging phenomenon can be suppressed. The other effects are the same as those of the first embodiment.

Further, the third embodiment can be applied to the second embodiment.

[Fourth Embodiment]

In the fourth embodiment, a capacitor element whose capacitance varies depending on the potential difference between nodes N1 and N2 is used instead of the capacitor Cb in FIG. 2. Specifically, a capacitor element having a characteristic that the capacitance thereof is reduced when the potential difference between nodes N1 and N2 becomes smaller can be used. As the capacitor element having the above characteristic, (1) a gate capacitor using an NMOSFET having a positive threshold value and (2) a MOS capacitor and the like can be provided.

(Gate Capacitor)

Figure 15:
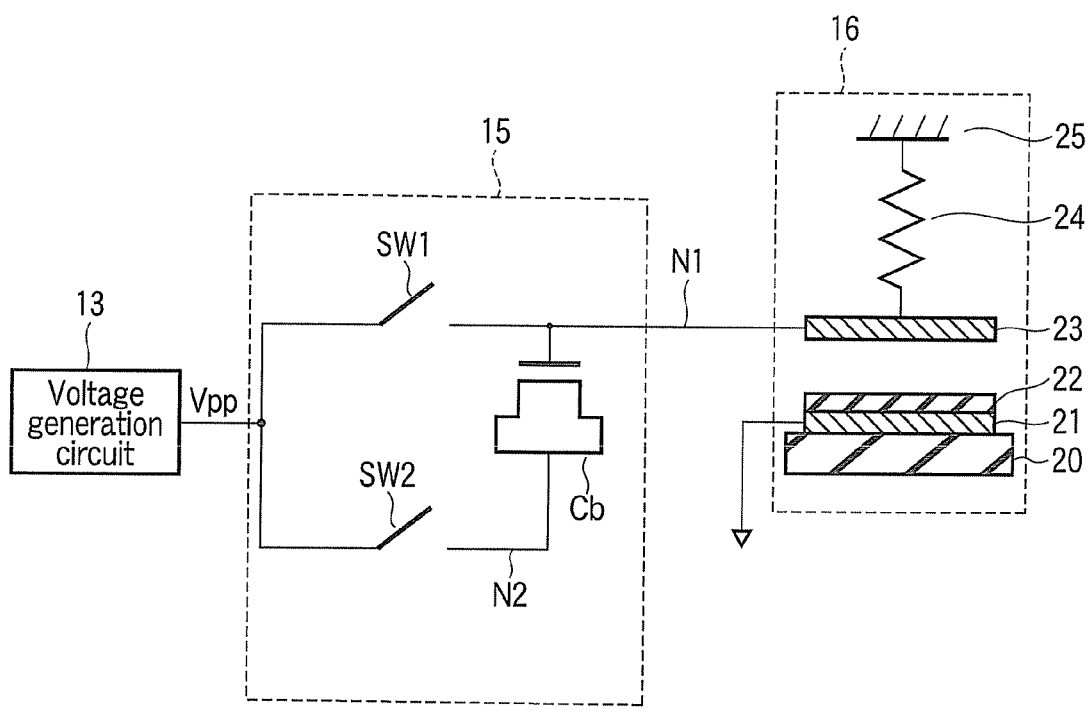
FIG. 15 is a block diagram showing the main portion of an electrostatic actuator apparatus 10 according to a fourth embodiment.

FIG. 15 is a block diagram showing the main portion of the electrostatic actuator apparatus 10 according to the fourth embodiment. The electrostatic actuator apparatus 10 is the same as the electrostatic actuator apparatus 10 of the first embodiment except that the capacitor Cb in FIG. 2 is replaced by a gate capacitor.

The gate capacitor Cb is configured by connecting the drain and source of an NMOSFET having a positive threshold voltage. The gate of the gate capacitor Cb is connected to node N1 and the drain and source of the gate capacitor Cb are connected to node N2.

FIG. 16 is a graph showing the characteristic of the gate capacitor Cb. In FIG. 16, the abscissa represents gate voltage Vg in volts and the ordinate represents capacitance Cb in femtofarads. In FIG. 16, the characteristics of two types of gate capacitors having different threshold voltages are shown.

As shown in FIG. 16, the capacitance of the gate capacitor Cb becomes smaller when the gate voltage lies between a flat-band voltage and the threshold voltage. Therefore, when the gate voltage of the gate capacitor Cb (that is a voltage of node N1) becomes lower than the threshold voltage, the capacitance of the gate capacitor Cb becomes small. As a result, the voltage of node N1, that is, actuation voltage Vact of the electrostatic actuator can be increased.

Therefore, according to the fourth embodiment, since voltage Vpp of the voltage generation circuit 13 can be set low, the size of the voltage generation circuit 13 can be reduced. Further, the power consumption of the electrostatic actuator apparatus 10 can be reduced.

(MOS Capacitor)

A MOS capacitor can be used as the capacitor Cb. FIG. 17 is a cross-sectional view showing the structure of the MOS capacitor Cb.

An N-type well (N-well) 40 is formed in a P-type semiconductor substrate (not shown). In the N-type well 40, impurity regions 41 and 42 are separately formed. The impurity regions 41 and 42 have the same conductivity type as that of the N-type well 40 and are formed by doping $N^+$-type impurity with high concentration into the N-type well 40. A gate insulating film 43 is formed on a portion of the N-type well 40 that lies between the impurity regions 41 and 42 and a gate electrode 44 is formed on the gate insulating film 43. For example, the gate electrode 44 is formed of polysilicon having N-type impurity doped therein.

A terminal T1 connected to the gate electrode 44 is connected to node N1 and a terminal T2 connected to the impurity regions 41 and 42 is connected to node N2.

Figure 18:
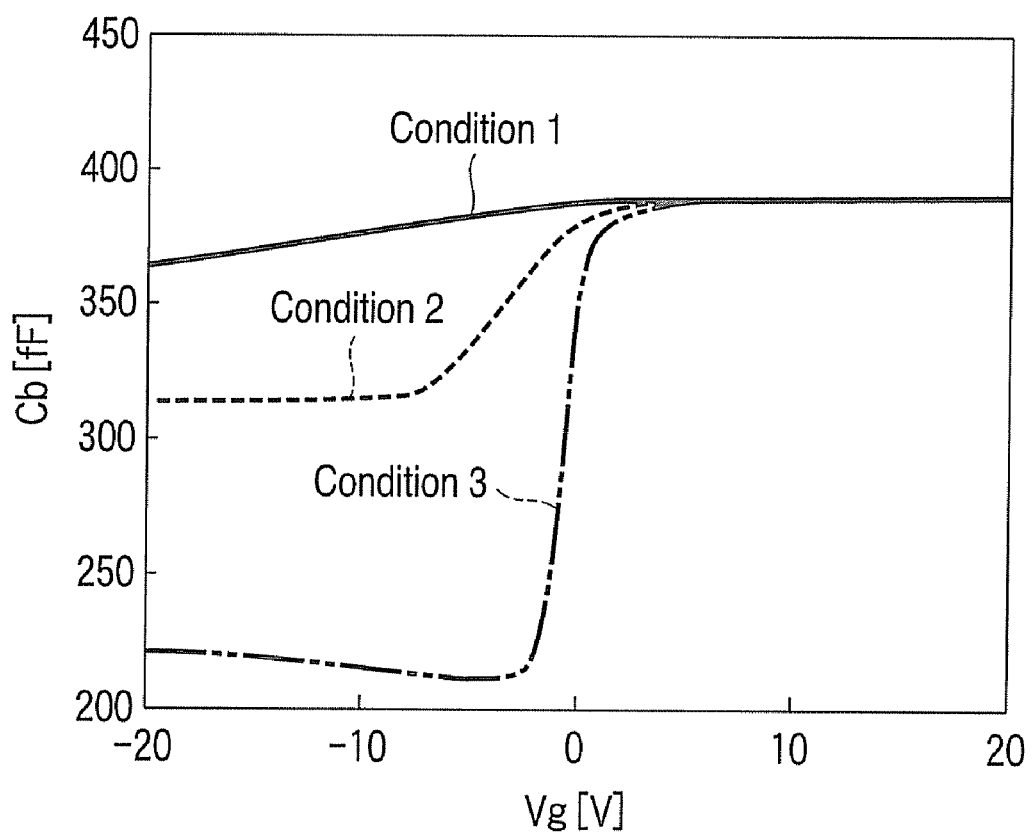
FIG. 18 is a graph showing the characteristics of the MOS capacitor Cb.

The capacitance of the MOS capacitor Cb varies by controlling the impurity concentration of the N-type well 40. FIG. 18 is a graph showing the characteristic of the MOS capacitor Cb. In FIG. 18, the abscissa represents gate voltage Vg in volts and the ordinate represents capacitance Cb in femtofarads.

As shown in FIG. 18, the capacitance of the MOS capacitor Cb can be varied by changing the impurity implantation condition. Specifically, a variation amount of the capacitance of the MOS capacitor Cb can be made larger as the impurity concentration becomes lower. The same effect as that obtained when the gate capacitor is used can be attained when the MOS capacitor Cb is used.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electrostatic actuator apparatus comprising:
a first voltage generation circuit configured to generate a first voltage;
a first switch connected between the first voltage generation circuit and a first node;
a second voltage generation circuit configured to generate a second voltage;
a second switch connected between the second voltage generation circuit and a second node;
a capacitor connected between the first node and the second node;
an electrostatic actuator having a drive electrode connected to the first node; and
a control circuit configured to perform an operation of sequentially turning on the first switch, turning off the first switch and turning on the second switch when the electrostatic actuator is driven.

2. The apparatus of claim 1, wherein an element other than a resistor element is not connected between the capacitor and the electrostatic actuator.

3. The apparatus of claim 1, wherein the first voltage is lower than an actuation voltage of the electrostatic actuator.

4. The apparatus of claim 1, wherein
the first switch comprises a first MOSFET and a first local booster that controls a gate voltage of the first MOSFET, and
the second switch comprises a second MOSFET and a second local booster that controls a gate voltage of the second MOSFET.

5. The apparatus of claim 4, wherein the first local booster sets the gate voltage of the first MOSFET to a third voltage higher than a ground voltage when the first MOSFET is turned off and the second MOSFET is turned on.

6. The apparatus of claim 5, wherein
the first local booster comprises a discharging circuit comprising a diode group and a third MOSFET of N-type, the diode group having diodes serially connected,
one end of the diode group is connected to a gate of the first MOSFET,
a drain of the third MOSFET is connected to the other end of the diode group, and
a source of the third MOSFET is grounded.

7. The apparatus of claim 4, wherein the first local booster further comprises a booster circuit that generates an on-voltage to turn on the first MOSFET.

8. The apparatus of claim 1, further comprising:
a first discharging circuit connected to the first node; and
a second discharging circuit connected to the second node.

9. The apparatus of claim 8, wherein
the first discharging circuit comprises a MOSFET of N-type whose drain is connected to the first node and whose source is grounded, and
the second discharging circuit comprises a MOSFET of N-type whose drain is connected to the second node and whose source is grounded.

10. The apparatus of claim 1, wherein the first voltage is the same as the second voltage.

11. The apparatus of claim 1, further comprising a low-pass filter connected between the capacitor and the electrostatic actuator.

12. The apparatus of claim 1, wherein the capacitor has a characteristic that a capacitance of the capacitor becomes smaller as the potential difference becomes smaller.

13. The apparatus of claim 12, wherein the capacitor is a gate capacitor.

14. The apparatus of claim 12, wherein the capacitor is a MOS capacitor.

15. The apparatus of claim 1, wherein each of the voltage generation circuits is a booster circuit.

16. The apparatus of claim 1, wherein
the electrostatic actuator comprises a first electrode provided on an insulating substrate, a second electrode that is provided above the first electrode and is vertically movable, an insulating film provided between the first electrode and the second electrode, and an elastic body configured to support the second electrode, and
the first electrode or the second electrode is connected to the first node.

* * * * *